Nov. 17, 1931.  A. MENKE  1,831,819
SOLDERING IRON
Filed Oct. 2, 1929
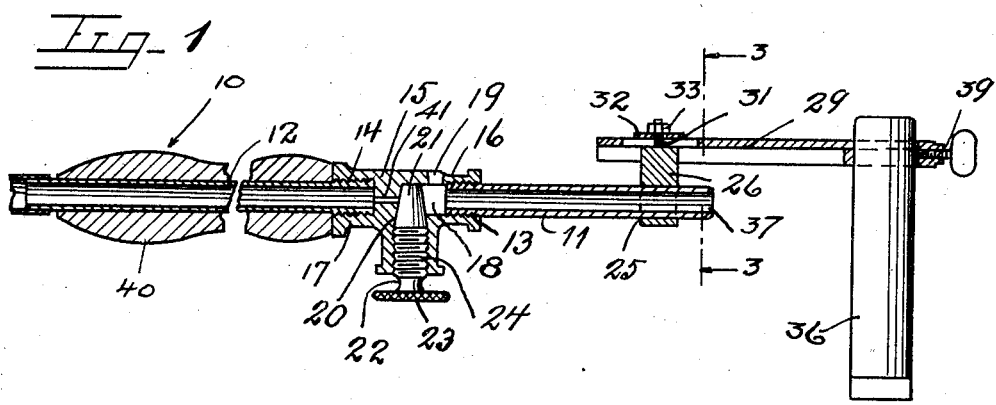
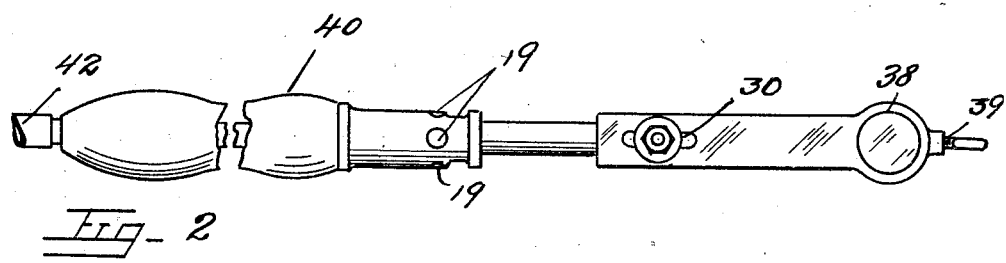
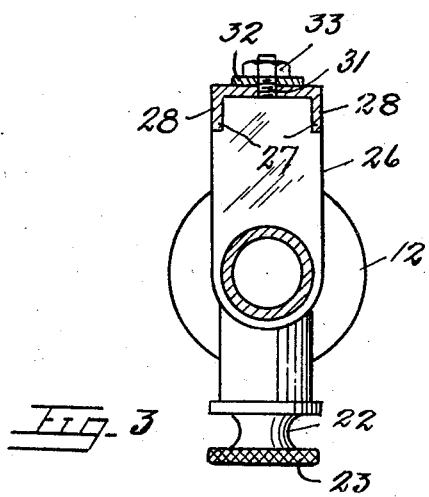
INVENTOR.
Adolf Menke
BY
Harry C. Schroeder
ATTORNEY Patented Nov. 17, 1931

1,831,819

UNITED STATES PATENT OFFICE

ADOLF MENKE, OF OAKLAND, CALIFORNIA

SOLDERING IRON

Application filed October 2, 1929. Serial No. 396,708.

The invention is for improvements in soldering tools generally and more particularly that type of soldering tool in which gas is used for heating the soldering tip.

The primary object of the invention is to provide a soldering tool of the character indicated which can be made of a plurality of detachable sections in order that the various sections may be readily detached one from another and packed in a tool kit in such manner as to consume the minimum space therein.

A further object of the invention is to provide a soldering tool of the type indicated in which the flow of gas to the burner tip may be easily and readily regulated as occasion may require.

Other objects of the invention not herein particularly set forth will appear from the following description thereof.

The invention consists primarily in the novel arrangements and combinations of the various elements and details of construction of said elements, all of which will appear in the following specification and which are claimed in the claims appended thereto.

The invention is clearly illustrated in the accompanying drawings in which:

Figure 1 is a longitudinal section of the device, the soldering tip being shown in full lines.

Figure 2 is a top plan view taken at right angles to Figure 1.

Figure 3 is a transverse sectional view, partly in full lines, taken on lines 3—3 of Figure 1.

Referring to the drawings, reference character 10 indicates the barrel or body portion of the device generally, which is composed of two gas pipes 11 and 12 which are screw-threaded at their inner ends as at 13 and 14 respectively for screw-threaded engagement with the valve housing 15 as at 16 and 17. The valve housing 15 is provided with a fuel mixer chamber 18 having air ports 19. The valve housing 15 has a sloping wall 20 for cooperation with the truncated cone shaped portion 21 with a valve closure member 22 which is provided with a knurled button 23 for rotating the valve closure member. The valve housing 15 has an internally screw-threaded bore 24 for receiving therein in screw-threaded engagement the valve closure member 22 as clearly shown in Figure 1. Pipe 11 has affixed thereto in any suitable manner, as by sweating at a point adjacent its outer end as at 25, bracket 26 which is recessed at its outer end as at 27 for cooperation with the side walls 28 of the channeled arm 29. Channeled arm 29 is provided through the face thereof with elongated slot 30 for reciprocal longitudinal movement therein of screw-threaded stud 31 which is carried by bracket 26. Screw-threaded stud 31 is provided with washer 32 and nut 33 for clamping the parts in adjusted position. It being understood that by loosening nut 33 the arm 29 may be readily moved with relation to bracket 26 for adjusting the distance between the soldering tip 36 and the burner tip 37 of gas pipe 11. Arm 29 is provided with opening 38 for adjustably receiving therein soldering tip 36. Tension screw 39 is provided for securing the soldering tip 36 in adjusted position transversely of the axis of the gas pipe 11. Gas pipe 12 is provided with hand grip 40 which is preferably made of wood or other relatively heat-non-conducting material.

It will be noted that valve housing 15 is provided with a bore 41 of a much lesser diameter than gas pipe 12 for communication between gas pipe 12 and mixing chamber 18. Gas pipe 12 may be connected with a source of gas supply in any suitable manner, preferably by flexible pipe 42.

Having thus described the invention what is claimed is:

1. A soldering iron comprising a tubular element, a supporting arm projecting outwardly from said tubular element and supported thereby and adjustable longitudinally thereof, a soldering copper transversely adjustable in said supporting arm, said tubular element communicating with a mixing chamber, and directed intermediately of said soldering copper, a mixing head having said mixing chamber formed therein, the rearward wall thereof being transversely, semi-frusto-conically formed, a frusto-conical seating element cooperating therewith and axially adjustable by screw-threaded means, a restricted aperture formed in said rearward wall, and communicating with a second tubular element and a handle on said second tubular element.

2. A soldering iron comprising a longitudinally and transversely adjustable soldering copper, transversely disposed relative to a jet and supported thereby, said jet being in communication with a mixing chamber, a mixing head, a mixing chamber therein, the rearward wall thereof being of semi-frusto-conical form, an aperture in said rearward wall communicating with a gas supply, a frusto-conical valve element cooperating with said rearward wall and axially adjustable by screw-threaded means, and air ports communicating with said mixing chamber.

3. In combination with a soldering copper and adjusting means therefor, and a jet directed toward said copper; a mixing head having an axial bore terminating in a semi-frusto-conical end section, and a restricted aperture communicating therewith, air ports radially disposed and communicating with said bore and a frusto-conical element cooperating with said end section and axially adjustable by screw threaded means.

In testimony whereof I have affixed my signature.

ADOLF MENKE.